United States Patent [19]

Andrews

[11] 4,431,756
[45] Feb. 14, 1984

[54] METHOD OF INCREASING THE VISCOSITY OF EPOXIDE RESIN COMPOSITIONS

[75] Inventor: Christopher M. Andrews, Cambridge, England

[73] Assignee: Ciba-Geigy Corporation, Ardsley, N.Y.

[21] Appl. No.: 430,639

[22] Filed: Sep. 30, 1982

[30] Foreign Application Priority Data

Nov. 13, 1981 [GB] United Kingdom ............... 8134290

[51] Int. Cl.³ .................... C08K 5/10; C08K 5/16; C08L 63/00
[52] U.S. Cl. ................................ 523/414; 523/415; 523/420; 523/456
[58] Field of Search ............... 523/443, 414, 415, 420, 523/456

[56] References Cited

U.S. PATENT DOCUMENTS 4,238,387 12/1980 Antonelli et al. ................. 523/466
4,304,693 12/1981 Boberski et al. ................. 523/402

FOREIGN PATENT DOCUMENTS 2255314 1/1974 Fed. Rep. of Germany .
926037 5/1963 United Kingdom .

OTHER PUBLICATIONS

Kirk–Othmer "Encyclopedia of Chemical Technology", vol. 20, p. 915.
Derwent 04103v/03.

*Primary Examiner*—Ronald W. Griffin
*Attorney, Agent, or Firm*—Luther A. R. Hall

[57] ABSTRACT

Thixotropic epoxide resin compositions, suitable for use as laminating resins, paints and lacquers, impregnating and casting resins, potting, insulating, and caulking compounds, sealants, and adhesives, are prepared by adding to an epoxide resin
(a) a base having a basic strength, $pK_b$, of 9 or less,
(b) an organo-orthosilicate of formula

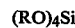

$$(RO)_4Si$$

where R represents an alkyl group, optionally substituted by one or more halogen atoms or alkoxy groups, an aryl or aralkyl group which may be substituted by one or more halogen atoms, alkyl groups, or alkoxy groups, or a heterocyclylalkyl group, and
(c) water.

Such compositions may further contain
(d) a curing agent for epoxide resins, which agent may be the same as, or different from, the base (a).

9 Claims, No Drawings

METHOD OF INCREASING THE VISCOSITY OF EPOXIDE RESIN COMPOSITIONS

BACKGROUND OF THE INVENTION

This invention relates to a method of increasing the viscosity of epoxide resin compositions having reduced flow.

It has long been known that epoxide resins, i.e., materials containing on average more than one 1,2-epoxide group, are highly desirable for use in gel coats and other "high build" (i.e., thick) coatings. Thixotropic compositions that are readily applied but which resist running and sagging, whereby formation of resin-starved areas is avoided, are particularly useful. Thixtropy can be induced by addition of silica or asbestos, but the incorporation of these materials liberates dusts and so causes handling problems. Their use has therefore been discouraged on environmental health grounds. Further, the thickening agents are incorporated into the resin or its hardener, or both, and an immediate increase in viscosity results. Therefore, when the resin and its hardener are mixed, equipment capable of handling viscous liquids must be used. Whilst this is perfectly satisfactory for many applications, there are occasions, particularly in civil engineering applications, when mixing must take place "on site," that is, away from special mixers and often outdoors, and hence possibly at low temperatures when the liquids will be even more viscous. To overcome the difficulty of mixing viscous liquids on site, methods have been proposed whereby only the mixture of resin and hardener is viscous or thixotropic, the individual components being free flowing.

British Patent Specification No. 1 230 334, for example, describes a process in which an increase in viscosity was effected by an in situ reaction between an aliphatic primary monoamine and an aliphatic or aromatic diisocyanate. According to British Patent Specification No. 1 454 388, an increase in viscosity may be achieved by in situ reaction between a primary polyamine, optionally containing a secondary polyamine, and a monoisocyanate, optionally with a diisocyanate.

Such formation of a polyurea results in thixotropic mixtures but it suffers from several drawbacks. It is extremely sensitive to slight changes in the quantities of amine and isocyanate, to variations in temperature, and to conditions used in mixing the components. In addition, if used with epoxide resins, the components cannot be supplied as a two-part pack since the isocyanate will react with both the epoxide resin and the amine. Such compositions have not met, therefore, with commercial success.

It has now been found that the viscosity of epoxide resins, alone or in admixture with a curing agent, may be increased to give thick or jelly-like liquids by incorporation of an organo-orthosilicate, an at least moderately strong base, and water. The effect is not merely one of thickening, since, on being stirred rapidly, the mixture of epoxide resin, organo-silicate, base, and water exhibits a strong reduction in viscosity, i.e., the mixture is thixotropic. It is believed, although the utility of this invention does not rely on the truth of this belief, that the base catalyses hydrolysis of the organo-orthosilicate by the water, resulting in rapid formation of hydrated silica in the resin and hence a rapid increase in the viscosity of the mixture.

This method overcomes many of the problems encountered with prior processes for bringing about an increase in viscosity. The compositions cause no dust hazard, they may be supplied as two part mixtures (since the silicate does not react with the epoxide resin), and the amount of silicate added is not especially critical. When such mixtures contain insufficient of the base to cure the epoxide resin they are stable on storage for prolonged periods yet, when mixed with a curing agent for epoxide resins, they cure readily. Such mixtures containing sufficient base to cure the epoxide resin are ideally suited for on-site mixing and curing.

Incorporation of organo-orthosilicates in epoxide resin compositions is not, in itself, new.

In USSR Pat. No. 421,659 (Chemical Abstracts Vol. 81, No. 140195q) compositions are described which have improved adhesion to slag glass-ceramic floorings and which contain an epoxide resin, a polyethylene polyamine as hardener, a liquid rubber, and tetraethoxysilane. In USSR Pat. No. 514 005 (Chemical Abstracts Vol. 85, No. 79056j) there are described epoxide compositions for filling seams in slag glass-ceramic floor tiles, containing an epoxide resin, butyl methacrylate, diethylenetriamine, and tetrakis(furfuryloxy)silane. In Japanese Published Patent Application No. 108450/1980 (Derwent C.P.I. Abstract No. 70390C) compositions curing at room temperature are described which contain an epoxide resin, a hardener such as diethylenetriamine, diethylaminopropylamine, or an amine-ethylene oxide adduct, and an organic silicon compound containing an alkenoxy or cycloalkenoxy group attached directly to silicon.

USSR Pat. No. 779 338 (Derwent C.P.I. Abstract No. 54758D) discloses polymeric concrete compositions comprising (i) an epoxide resin, (ii) ethylenediamine as a curing agent for (i), (iii) ethyl silicate, (iv) water, and (v) metallised carbon fibre as electroconductor. The compositions generally contain, per 100 parts of weight of (i), 7 to 14 parts of (ii), 15 to 100 parts of (iii), 3 to 6 parts of (iv), and 10 to 50 parts of (y), together with 125 to 500 parts of a mineral filler. The compositions are for use in coatings and the manufacture of electric heaters, and the incorporation of (iii) together with the choice of the particular curing agent, i.e., (ii), and electroconductor, i.e., (y), is said to result in a composition with increased conductivity.

Japanese Published Patent application No. 56-125465 (Derwent C.P.I. Abstract No. 84394D) discloses coating compositions comprising, by weight, (vi) 100 parts of an orthosilicate of formula $R^1{}_2Si(OR^2)_2$, $R^1Si(OR^2)_3$, or $Si(OR^2)_4$, where $R^1$ denotes alkyl of 1 to 5 carbon atoms or phenyl and $R^2$ denotes alkyl of 1 to 3 carbon atoms or a hydrogen atom, (vii) 5 to 25 parts of an epoxide resin, (viii) 30 to 60 parts of an aminosilane of formula $H_2NR^3Si(R^1)(OR^2)_2$, $H_2NR^3Si(OR^2)_3$, $H_2NR^4NHR^3Si(R^1)(OR^2)_2$, or $H_2NR^4NHR^3Si(OR^2)_3$, where $R^3$ denotes alkyl of 1 to 5 carbon atoms and $R^4$ denotes alkyl of 1 to 3 carbon atoms or acyl, (ix) 7 to 8 parts of a polyamine of formula $H_2N(R^5)_nNH(R^5)_nNH_2$ or $H_2N(R^5NH)_nR^5NH_2$, where $R^5$ denotes alkyl of 1 or 2 carbon atoms and n is 1 to 6, (x) 5 to 15 parts of water, (xi) 50 to 150 parts of solvent, and (xii) 2 to 7 parts of an acid catalyst.

In none of the references is there mentioned the possibility of increasing the viscosity of the mixtures and formation of thixotropy.

SUMMARY OF THE INVENTION

This invention accordingly provides a method of increasing the viscosity of epoxide resins which comprises adding to an epoxide resin (a) a base having a basic strength, $pK_b$, of 9 or less,
(b) an organo-orthosilicate of formula $$(R^6O)_4\text{—Si} \qquad \qquad I$$

where $R^6$ represents an alkyl group, which may be substituted by one or more halogen atoms or alkoxy groups, an aryl group, which may be substituted by one or more halogen atoms, alkyl groups or alkoxy groups, an aralkyl group, which may be substituted on the aryl moiety by one or more halogen atoms, alkyl groups, or alkoxy groups, or a heterocyclylalkyl group, all the abovementioned alkyl and alkoxy groups having from 1 to 15 carbon atoms and the aryl groups having from 6 to 10 carbon atoms, and (c) water, and allowing the composition to develop thixotropy.

If desired there is further added (d) a curing agent for epoxide resins.

There is thus further provided a process for curing an epoxide resin which comprises carrying out the method of this invention in the presence of a curing agent for epoxide resins and allowing or causing the composition to cure.

DETAILED DISCLOSURE

The amount of water (c) incorporated into these compositions is not critical, provided it is sufficient to hydrolyse at least partially the silicate (b). Incorporating large quantities of water into an epoxide resin composition is, however, often difficult, because of phase separation. Generally, amounts of water that are 0.5 to 10 moles per mole of silicate (b) are preferred.

The amount of silicate (B) incorporated will depend upon the physical properties required of the mixture. Generally, amounts within the range 5 to 50% by weight, calculated on the weight of epoxide resin, are preferred. These organo-orthosilicates may be derived from any alcohol or phenol of formula $R^6OH$ but, since the alcohol or phenol is liberated by the hydrolysis, it is preferred in the case of orthosilicates derived from volatile alcohols (i.e., alcohols having a boiling point at atmospheric pressure below about 80° C.) that the liberated alcohol is removed by distillation or other means before the composition is mixed with the curing agent (d). If this volatile alcohol is not removed, foaming of the mixture of epoxide resin and curing agent may occur, such foaming usually being undesirable.

Preferred silicates (b) are those wherein $R^6$ represents an alkyl group from 1 to 15 carbon atoms, which may be substituted by a chlorine or bromine atom or by an alkoxy group of from 1 to 6 carbon atoms, or a phenyl or benzyl group, both of which may be unsubstituted or substituted on the phenyl ring by an alkyl group of from 1 to 10 carbon atoms.

Particularly preferred silicates (b) are those wherein $R^6$ represents ethyl, ethyl substituted by one alkoxy group of from 2 to 4 carbon atoms or by one chlorine atom, a phenyl group, a phenyl group substituted by an alkyl group of from 1 to 4 carbon atoms, or a benzyl group.

The amount of the base (a) added must be sufficient to catalyse hydrolysis of the silicate (b). Generally, amounts within the range 0.1–10% calculated on the weight of the epoxide resin, are preferred.

Bases suitable to catalyse the hydrolysis preferably have a basic strength $pK_b$ below about 7. Those having a basic strength above this figure, but less than 9, can be used but their catalytic action is weak and the increase in viscosity make take several hours to reach its full extent.

The base (a) may be a primary, secondary, or tertiary amine and may be aliphatic, araliphatic, cycloaliphatic, or heterocyclic. Preferred amongst such amines are alkylenediamines, polyalkylenepolyamines, N-heterocycles, aminoalkylated N-heterocycles, aralkylenediamines, poly(aminoamides), trialkylamines, aralkyldialkylamines, mono-, di-, and tri-alkanolamines, and cycloalkylamines. Typical amongst this preferred class are hexamethylenediamine and its 2,2,4- and 2,4,4-trimethyl derivatives, triethylenetetramine, N-benzyldimethylamine, triethylamine, piperidine, m-xylylenediamine, 3-aminomethyl-3,5,5-trimethylcyclohexylamine (otherwise known as isophoronediamine), and N-(2-aminoethyl)piperazine.

It will be readily appreciated that the base (a) and the curing agent (d) may be the same material, added in sufficient quantity to satisfy both functions (i.e., catalysis of hydrolysis of the silicate (b) and cure of the epoxide resin). When such is the case, the amount of base added is that conventionally used in epoxide resin compositions and well understood by those skilled in the art. As an example, for primary and secondary amines 0.75 to 1.25 amino hydrogen atoms are incorporated per 1,2-epoxide group of the epoxide resin, while for tertiary amines 0.1 to 20%, based on the weight of the epoxide resin, may be used.

When the base (a) is not the same as the curing agent (d) the latter may be a weak amine such as an aromatic amine, especially o-, m-, or p-phenylenediamine, bis(4-aminophenyl)methane, aniline-formaldehyde resins, bis(4-aminophenyl) ether, bis(4-aminophenyl) ketone, bis(4-aminophenyl) sulphide, bis(3-aminophenyl) sulphone, and bis(4-aminophenyl) sulphone. Other curing agents which may be used include dicyandiamide; isocyanates and isothiocyanates; polyhydric phenols, e.g., resorcinol, hydroquinone, 2,2-bis(4-hydroxyphenyl)-propane, and phenol-aldehyde resins; polythiols such as the "Thiokols" ("Thiokol" is a registered trade mark); and polycarboxylic acids and their anhydrides, e.g., phthalic anhydride, tetrahydrophthalic anhydride, methylenedomethylenetetrahydrophthalic anhydride, nonenylsuccinic anhydride, dodecenylsuccinic anhydride, hexahydrophthalic anhydride, hexachloroendomethylenetetrahydrophthalic anhydride and endomethylenetetrahydrophthalic anhydride and their mixtures, maleic anhydride, succinic anhydride, pyromellitic acid dianhydride, benzophenone-3,3',4,4'-tetracarboxylic acid dianhydride, polysebacic anhydride, polyazelaic anhydride, the acids corresponding to the aforementioned anhydrides, and also isophthalic acid, terephthalic acid, citric acid, and mellitic acid. There may also be used catalytic curing agents, for example Friedel-Crafts catalysts such as boron trifluoride and its complexes, and chelates formed by reaction of boron trifluoride with, e.g., 1,3-diketones.

When a curing agent (d) is added, an effective amount (i.e., a curing amount) is employed. The proportion will depend on the chemical nature of the curing agent and the properties sought of the curable compositions and its cured product; the optimum proportion can readily be determined by methods familiar to those skilled in the art. By way of illustration, however, when the curing agent (d) is an aromatic amine there will normally be used from about 0.75 to 1.25 amino-hydrogen equivalents of the amine per 1,2-epoxide equivalent of the epoxide resin. When polycarboxylic acids or their anhydrides are used, usually from about 0.4 to 1.1 carboxylic acid, or carboxylic acid anhydride, equivalents are taken per 1,2-epoxide equivalent, while with polyhydric phenols about 0.75 to 1.25 phenolic hydroxy equivalents of the curing agent per 1,2-epoxide equivalent are employed. Generally, from 1 to 40 parts by weight of a catalytic curing agent are used per 100 parts by weight of the epoxide resin.

Curing can be carried out, depending on the nature of the curing agent, at room temperature (say, 18° to 25° C.) or at higher temperatures (50° to 180° C., for example).

Epoxide resins which may be employed in these compositions are preferably those containing groups of formula

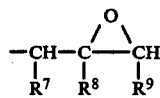  II directly attached to atoms of oxygen, nitrogen, or sulphur, where either $R^7$ and $R^9$ each represent a hydrogen atom, in which case $R^8$ denotes a hydrogen atom or a methyl group, or $R^7$ and $R^9$ together represent $-CH_2CH_2-$, in which case $R^8$ denotes a hydrogen atom.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4-dihydroxydiphenyl, bis(4-hydroxyphenyl) sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.-butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneureas and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula II where $R^7$ and $R^9$ conjointly denote a $-CH_2CH_2-$ group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid or p-hydroxybenzoic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)-propane.

If desired, a mixture of epoxide resins may be used.

Preferred epoxide resins are polyglycidyl ethers, polyglycidyl esters, and N,N'-diglycidylhydantoins. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from 1 to 9 carbon atoms, and having a 1,2-epoxide content of at least 0.5 equivalent per kilogram.

The compositions may further contain additives such as fillers, reinforcing materials, colouring matter, flame inhibitors, and mould lubricants. Suitable extenders, fillers, and reinforcing materials are, for example, glass fibres, carbon fibres, aramid fibres, ballotini, mica, quartz flour, calcium carbonate, cellulose, kaolin, wollastonite, powdered poly(vinyl chloride), and powdered polyolefin hydrocarbons such as polyethylene and polypropylene.

The curable compositions of this invention may be used as laminating resins, paints and lacquers, impregnating and casting resins, potting and insulating compounds for the electrical industry, sealants or caulking compounds, and adhesives, and also in the manufacture of such products. They may be supplied as a two-part pack, one part containing the epoxide resin and the silicate (b) and the other containing the base (a) and, if used, the curing agent (d).

The following Examples illustrate the invention; all parts are by weight.

"Epoxide resin I" denotes a diglycidyl ether of 2,2-bis(4-hydroxyphenyl)propane having a 1,2-epoxide content of 5.16 equivalents per kilogram "Epoxide resin II" denotes the diglycidyl ester of hexahydrophthalic acid, having a 1,2-epoxide content of 6.5 equivalents per kilogram "Amine I" denotes a commercially-available mixture, in approximately equimolar proportions, of 2,2,4-trimethylhexamethylenediamine and 2,4,4-trimethylhexamethylenediamine "Amine II" denotes isophoronediamine "Amine III" denotes triethylenetetramine "Amine IV" denotes bis(4-aminophenyl)methane "Amine V" denotes N-benzyldimethylamine "Amine VI" denotes a polyaminoamide made from dimerised linoleic acid and triethylenetetramine; it was obtained under the designation "Versamid 140" from Cray Valley Products Ltd., Orpington, Kent, England ("Versamid" is a registered Trade Mark)

"Amine VII" denotes pyridine

"Amine VIII" denotes triethylamine.

EXAMPLE 1

Epoxide resin I (20 parts) and tetra(2-ethoxyethyl) orthosilicate (3 parts) were mixed at room temperature to give a thin liquid. Separately, Amine I (4.2 parts) and water (0.6 part) were combined, again giving a thin liquid. These two liquids were then combined and the mixture could be stirred very easily at first but within 30 seconds it had formed a thixotropic paste of controlled flow. This paste hardened to a solid within 3 to 4 hours and was fully cured to a tough, infusible solid within 24 hours.

EXAMPLES 2–11

Example 1 was repeated, using 20 parts of Epoxide resin I and the materials and quantities shown in Table I. The times for formation of a thixotropic paste and solidification are also shown in this Table.

TABLE I

| Example | Amine Type | Amine Parts | Orthosilicate Type | Orthosilicate Parts | Water (Parts) | Time to form Paste | Time to form Solid |
|---|---|---|---|---|---|---|---|
| 2 | I | 4.2 | tetrabenzyl | 3 | 0.5 | 1 min. | 30 mins. |
| 3 | I | 4.2 | tetra(2-chloroethyl) | 3 | 0.75 | 15 secs. | 30 mins. |
| 4 | I | 4.2 | tetraethyl | 5 | 1.7 | 2.5 mins. | 30 mins.* |
| 5 | I | 4.2 | tetra(2-n-butoxyethyl) | 4 | 0.6 | 30 secs. | 3–4 hrs. |
| 6 | II | 4.5 | tetra(2-ethoxyethyl) | 5 | 1.0 | 1.5 mins. | 4 hrs. |
| 7 | III | 2.4 | tetra(2-ethoxyethyl) | 3 | 0.6 | 3 mins. | 2 hrs. |
| 8 | I | 4.2 | tetra(2-ethoxyethyl) | 3 | 0.3 | 1 min. | 3–4 hrs. |
| 9 | I | 4.2 | tetra(2-ethoxyethyl) | 3 | 0.9 | 20 secs. | 3–4 hrs. |
| 10 | I | 4.2 | tetra(2-ethoxyethyl) | 3 | 1.2 | 20 secs. | 3–4 hrs. |
| 11 | VI | 10 | tetra(2-ethoxyethyl) | 2 | 0.8 | 3 mins. | 1.5 hrs. |

*This mixture formed a rigid foam

In Examples 2, 3, 5, and 8 to 11, the time to full cure was less than 24 hours. In the other Examples this time was not determined.

EXAMPLE 12

Epoxide resin I (20 parts) and tetrabenzyl orthosilicate (4 parts) were mixed to give a thin liquid. This was then mixed with Amine V (0.1 part) and water (0.5 part). This quantity of amine was sufficient to catalyse the hydrolysis of the orthosilicate, but insufficient to cure the epoxide resin. The mixture became thick and thixotropic within about 1½ hours and was stable on storage at room temperature for over 3 months. When mixed with Amine I (4.2 parts) it formed a solid after 30 minutes and was completely cured within 24 hours.

EXAMPLES 13–15

Example 1 was repeated, using 20 parts of Epoxide resin I, 0.5 part water, and the materials and quantities shown in Table II. The times for thixotropic paste formation and for solidification are also shown in this Table.

TABLE 2

| Example | Amine Type | Amine Parts | Orthosilicate Type | Orthosilicate Parts | Time to form Thixotropic paste | Solid |
|---|---|---|---|---|---|---|
| 13 | I | 4.2 | tetraphenyl | 4 | 30 secs. | 4 mins. |
| 14 | I | 4.2 | tetra(m-cresyl) | 4 | 30 secs. | 5 mins. |
| 15 | I<br>IV | 1.0<br>4.9 | tetrabenzyl | 4 | 1½ mins. | 24 hrs. |

EXAMPLE 16

Epoxide resin II (20 parts) was mixed with tetrabenzyl orthosilicate (4 parts) to give a free-flowing liquid and this was combined with a mixture of Amine I (5 parts) and water (0.5 part). The mixture became thick and thixotropic within 30 seconds and solidified after 25 minutes.

EXAMPLE 17

Epoxide resin I (20 parts) was mixed with tetraethyl orthosilicate (2 parts) and the mixture was blended with Amine V (0.1 part) and water (0.7 part). The mixture became thixotropic within 2 hours. It was then placed in an open dish and warmed in an oven at 60° C. under reduced pressure (15 mm Hg) to remove ethanol liberated during the hydrolysis. When the ethanol had been completely removed the resultant product was still thixotropic and was stable on storage for over 3 months.

EXAMPLE 18

Epoxide resin I (20 parts) was mixed with tetrabenzyl orthosilicate (4 parts), Amine VII (1 part), and water (0.5 part). The mixture became thixotropic within about 3 hours and was then stable on storage for over 3 months. When the experiment was repeated using 2 parts of Amine VII, thixotropy was achieved within 2½ hours, and the product was stable on storage for over 3 months.

EXAMPLE 19

Example 18 was repeated, replacing the Amine VII by Amine VIII (0.1 part or 2.5 parts). Using the lesser amount of Amine, thixotropy was achieved within 30 minutes, whilst with the larger amount of Amine it was achieved after 15 minutes.

EXAMPLE 20

A mixture of Epoxide resin I (20 parts), tetrabenzyl silicate (3 parts), dicyandiamide (1.4 parts), N-(p-chlorophenyl)-N',N'-dimethylurea (1.8 parts) as accelerator, and water (0.4 part) was passed through a roll mill. After passage through the mill the mixture became thixotropic again. A sample, heated on a hot block at 120° C., gelled in 14 minutes.

COMPARATIVE EXAMPLES

In order to show the effect of omitting water or the amine, the following experiments were carried out:

1. Epoxide resin I (20 parts) was mixed with tetrabenzyl orthosilicate (4 parts) and with Amine I (4.2 parts). The mixture was allowed to stand in the atmosphere and formed a thixotropic "skin," due to atmospheric moisture, whilst the bulk remained liquid for about 6 hours, after which time it solidified. When this experiment was repeated, but with the mixture placed in a desiccator over calcium chloride, no skinning was observed and the mixture solidified after about 4 hours.

2. Epoxide resin I (20 parts) was mixed with tetrabenzyl orthosilicate (4 parts) and water (0.5 part). The mixture remained free flowing, showing no signs of thixotropy or solidification after 48 hours.

What is claimed is:

1. A method of increasing the viscosity of epoxide resins which comprises adding to an epoxide resin (a) a base having a basic strength, $pK_b$, of at most 9, (b) from 5 to 50% by weight, calculated on the weight of the epoxide resin, of an organo-orthosilicate of formula

    $(R^6O)_4-Si$ where $R^6$ represents an alkyl group, an alkyl group substituted by at least one halogen atom, an alkyl group substituted by at least one alkoxy group, an aryl group, an aryl group substituted by at least one halogen atom, an aryl group substituted by at least one alkyl group, an aryl group substituted by at least one alkoxy group, an aralkyl group, an aralkyl group substituted on the aryl moiety by at least one halogen atom, an aralkyl group substituted on the aryl moiety by at least one alkyl group, an aralkyl group substituted on the aryl moiety by at least one alkoxy group, or a heterocyclylalkyl group, all of the above-mentioned alkyl and alkoxy groups having from 1 to 15 carbon atoms and the aryl groups having from 6 to 10 carbon atoms, and (c) water, and allowing the composition to develop thixotropy.

2. The method of claim 1, in which there is added 0.5 to 10 moles of water per mole of the silicate (b).

3. The method of claim 1, in which there is added from 0.1 to 10% by weight of the base (a), calculated on the weight of the epoxide resin.

4. The method of claim 1, in which the base (a) is an aliphatic, araliphatic, cycloaliphatic, or heterocyclic primary, secondary, or tertiary amine.

5. The method of claim 1, wherein there is added an effective amount of a curing agent (d) for epoxide resins which is the same as the base (a).

6. The method of claim 5, wherein the base (a) and the curing agent (d) is a primary or secondary amine, the amount being such as to provide 0.75 to 1.25 amino hydrogen atoms per 1,2-epoxide group of the epoxide resin.

7. The method of claim 5, wherein the base (a) and the curing agent (d) is a tertiary amine and comprises 0.1 to 20% by weight, based on the weight of the epoxide resin.

8. The method of claim 1, wherein there is added an effective amount of a curing agent (d) for epoxide resins which is not the same as the base (a).

9. The method of claim 8, wherein the curing agent (d) is an aromatic amine, dicyandiamide, an isocyanate, an isothiocyanate, a polyhydric phenol, a polythiol, a polycarboxylic acid anhydride, or a catalytic curing agent.

* * * * *